United States Patent [19]

Peters

[11] 4,141,041
[45] Feb. 20, 1979

[54] PRECISION GAIN BALANCE OF TWO VIDEO SOURCES FOR A SINGLE DISPLAY

[75] Inventor: David L. Peters, Whitney Point, N.Y.

[73] Assignee: The Singer Company, Binghamton, N.Y.

[21] Appl. No.: 725,449

[22] Filed: Sep. 22, 1976

[51] Int. Cl.² ............................................. H04N 5/22
[52] U.S. Cl. .................... 358/183; 358/174; 358/184
[58] Field of Search ............... 358/183, 93, 160, 168, 358/169, 174, 184

[56] References Cited
U.S. PATENT DOCUMENTS 3,673,324   6/1972   Ito et al. .............................. 358/183

FOREIGN PATENT DOCUMENTS 1413496   11/1975   United Kingdom .................... 358/183

Primary Examiner—Richard Murray
Attorney, Agent, or Firm—Richard J. Paciulan; Jeff Rothenberg

[57] ABSTRACT

Two video signals are precisely gain balanced so that one video signal may be inserted, unnoticeably, into a display derived from the first of the two video signals. To this end, a strobe is generated as the inset video signal is initiated. Both the inset video and the display video signals are sampled at the time said strobe is generated. A difference signal is derived from both samples and the gain of the inset video channel is adjusted in accord with the magnitude of that difference signal in a manner so as to minimize that magnitude.

20 Claims, 3 Drawing Figures

PRECISION GAIN BALANCE OF TWO VIDEO SOURCES FOR A SINGLE DISPLAY

BACKGROUND

1. Field of the Invention

The invention relates to video insertion techniques in cathode ray display systems. More particularly, the invention relates to the precision gain balancing of two video sources so that by video insertion techniques the two may be combined into a single display without alerting the viewer that a video insertion has taken place.

2. Description of the Prior Art

In simulator training devices, much use is made of scale models. A gantry-mounted optical probe is maneuvered about the scale model in accordance with the manner in which a trainee manipulates the controls of the simulator trainer device. A typical scale model will include an airport and the territory surrounding it. For greatest training purposes, an existing airport and the terrain peculiar to that airport are carefully reproduced on the scale model board. In this manner a trainee learning to fly an aircraft becomes familiar with the airfield approaches at the same time as he learns to handle the controls of the particular aircraft simulated.

In certain instances where training, taxiing, and maneuvering among other aircraft parked at the airport may be required, significant detailing of the airport, its buildings, and the various parked aircraft is required. In such instances two model boards are usually provided. One at a scale which will allow the trainee to view the airport and its surrounding terrain and the other model, built to a larger scale, showing the airport itself in greater detail. Two model boards are used since it would be impractical in terms of expense and space requirements to produce a single model board in sufficient detail and of large enough scale to detail the airport area and include enough of the surrounding terrain to give sufficient training in flying above that terrain.

A similar situation will arise in the case in which the trainer simulates a spacecraft. If one considers the scene viewed by the astronaut-pilot of an incoming spacecraft, it will be realized that a large sector of the surface of the earth will be in view as the astronaut maneuvers his craft to reduce the energy of his fall. The closer the astronaut comes to the earth, the smaller is the sector of earth that he views. Eventually his landing site will become discernible and he will target-in on that area and make his landing approach and touch-down at the designated site.

In terms of camera models, it will be obvious that the model depicting the view from space, that large sector of earth viewed by the astronaut, will require relatively little detail. However, the landing site itself must provide significantly greater detail to guide the astronaut pilot to a safe landing as he approaches closer to the ground. Thus, a second model board of the designated landing site built to a significantly greater scale than that of the vast sector of earth depicted in the first model board, is required in order to guide and train the astronaut-pilot in his landing maneuver.

Although the two situations set forth above are similar in that they each require at least two model boards to be utilized with the simulator trainer, the problems presented, in effectively implementing such training, are quite different. For example, a typical ploy for shifting a pilot's presentation from the small scale, low detail model of the airport and its environs is to allow the trainee to begin a normal approach to the airport. However, it may be conveniently arranged that a simulated cloud bank must be traversed as he comes closer to the airport. As the trainee apparently enters into the cloud bank, the camera probe, which is not then presenting scale model information to the trainee, is moved over and above the large scale, high detail model of the airport itself. Thus, as the pilot breaks from the clouds he finds himself still on his approach path and in clear sight of the airport, which he sees in great detail.

When an astronaut is piloting his craft on its return flight to earth the designated landing site begins to assume significant detail while the aircraft is still at such an altitude that the surrounding terrain forms a significant part of the pilot's field of view. This requires the continual insetting of details from the large scale, landing-site model rather than merely making a single transition from one scale model to the next. As the spacecraft continues its descent, the landing site assumes a greater proportion of the image presented to the astronaut-pilot, the environs assuming less importance as the pilot concentrates on his landing site. Eventually an altitude is reached at which only the designated landing site fills the pilot's field of view. At this time no further insetting is required and only the greatly detailed, high scale model of the landing site is required.

Since there is a continual process of insetting the image of the highly detailed landing site within the image of the high altitude, low detail model, it is impractical to consider the use of a conveniently simulated cloud layer to disguise the imagery transition. Such trickery would become readily apparent to the trainee-operator of the simulator. The problem, therefore, is to enable the continual insertion of a detailed image of the landing site into the display presented to the astronaut-trainee in such a manner that no visual "glitches" are presented to the astronaut so as to distract him or impair the sense of reality sought to be created within the simulator environment.

Television viewers have been aware of insetting techniques for some time. This occurs when a picture appears in one corner of the TV presentation while the main scene continues to be played on the balance of the screen. However, there are other instances in which commercial television stations make use of insetting techniques and the viewer is unaware that part of the picture he is viewing is produced by an inset. Often this latter technique is employed when the entertainer being viewed on TV appears to enter into a model stage set much smaller than the entertainer himself. Frequent use of this technique is made in advertising in which the product advertised appears larger-than-life and dwarfs the individual on the screen who is advocating the use of the product being advertised.

In a simulator environment there may be no sharp line of demarcation between the background scene and the landing site image to be inset therein, such as occurs in the examples of commercial television techniques just noted. The image inset in the simulator display must appear to blend evenly and be a part of the entire scene. The point of view from which the overall scene is observed must agree with that in which the inset image is viewed. For most effective training, the operator must be completely unaware of the utilization of any insetting whatsoever.

The smooth blending of the inset image into the overall display is especially dependent upon the gain balance in each image channel. If the gain of the inset channel is higher than that of the overall display channel, the inset will appear as a bright blotch on the display. Conversely, if the inset channel gain is too low, the entire inset image will be darker than the rest of the display.

It shall be an object of the present invention to provide a means of precision gain-balancing two video channels for use in a single display. It shall further be an object of the invention to permit switching between two video channels without noticeable brightness change.

SUMMARY OF THE INVENTION

In a visual display system it is sometimes desirable to inset video from one source into the display derived from another video source. The present invention makes it possible to achieve such insetting without a noticeable change in brightness between that video originally displayed and that video which is inset into the display.

In describing the operation of the invention, two terms will be used: "display video", and, "inset video". "Display video" will be taken to mean that video presentation originally displayed for viewing. "Inset video" will be that video which is to be inset into the display derived from the "display video".

In order that both the inset video and the display video channels may be balanced, so as to preclude differences in brightness in the display from each channel, a strobe is generated at the same time the inset video is initiated. Both the inset and the display video are sampled at the time the strobe is generated. The difference between the inset and display video samples is determined and the gain of the inset video channel is adjusted until this difference is nulled. When no difference exists, the display video is terminated and the inset video is displayed to the viewer.

In this manner, the inset scene is displayed with the same brightness as that of the scene originally displayed. The two scenes will blend together and the viewer will be unaware that an inset has occurred.

DESCRIPTION OF THE INVENTION

In the embodiment of the invention to be disclosed, both the display video and the inset video will contain much of the same information. However, the inset video will contain that information in greater detail. This is typical of the case discussed earlier in which a small scale model is viewed by an incoming astronaut until such time as he approaches his landing site and greater detail becomes required, at which point video derived from a large scale model of the landing site is inserted.

Figure 1:
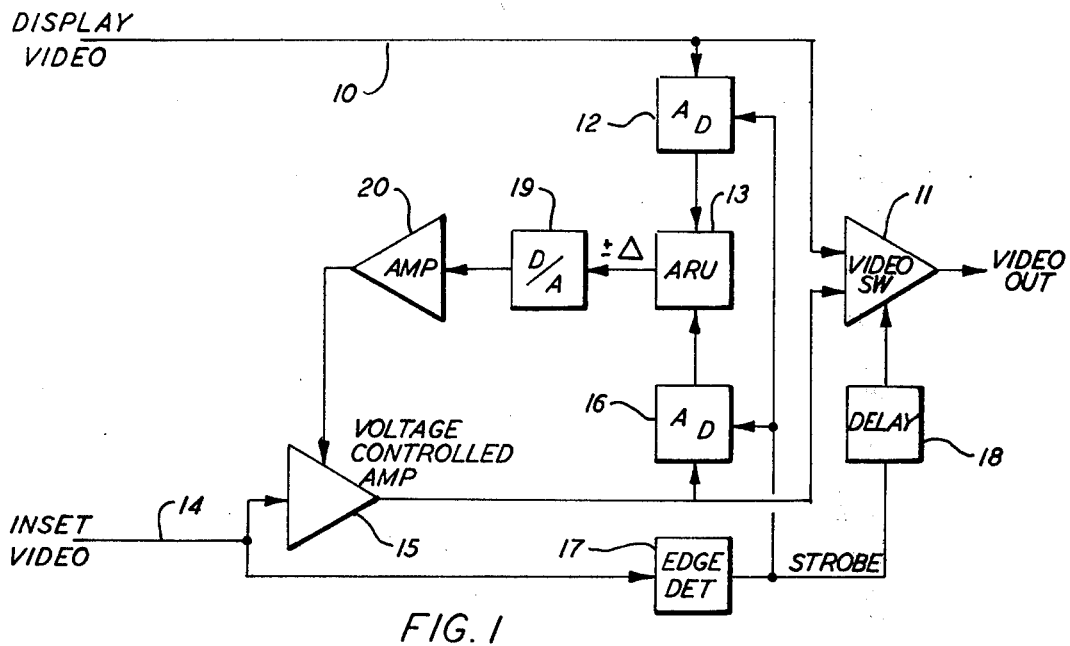
FIG. 1 is an embodiment of the invention using high speed, broad band converters.

FIG. 1 illustrates the invention as comprised of high speed, broad band components. The display video is impressed upon line 10 from which it is passed to video switch 11 and thence out to the visual display circuitry. The display video is also passed from line 10 to A/D converter 12. Upon being strobed, A/D converter 12 passes its content to arithmetic unit 13.

The inset video is input on line 14 from whence it is passed through voltage-controlled amplifier 15 and video switch 11 and A/D converter 16. When strobed, the output of A/D converter 16 is passed to arithmetic unit 13.

A portion of the inset video signal impressed on line 14 is passed through edge detector 17. The inset video signal is initiated and terminated by means not shown in FIG. 1. Edge detector 17 will generate a strobe output when the inset video signal is so initiated and so terminated. The strobe output of edge detector 17 is fed to A/D converters 12 and 16 and through the delay line 18 to the control gate of video switch 11.

Arithmetic unit 13 outputs the difference of the signals derived from A/D converters 12 and 16. The sense of this different signal, both positive and negative, is preserved. This digital difference signal is converted to an analog voltage by D/A converter 19, which analog voltage is used to control the amplitude of the output of amplifier 20. The output of amplifier 20 is fed as a control signal to voltage-controlled amplifier 15 whereby the gain of amplifier 15 is thereby determined.

In operation, display video will be present on line 10 and video switch 11 will be operative to pass the display video out to the electronic display circuitry. When a scene is to be inset into the display, the inset video is initiated and impressed upon line 14. At that time edge detector 17 generates a strobe to A/D converters 12 and 16 thereby establishing a difference signal at the output of arithmetic unit 13. The same strobe is also passed to video switch 11. However, because of delay 18, video switch 11 continues to pass display video.

With the difference signal determined at the output of the arithmetic unit, D/A converter 19 establishes the voltage output of amplifier 20 which, in turn, modifies the gain of voltage-controlled amplifier 15 so as to minimize the magnitude of the difference signal. Delay line 18 has a delay of approximately 30 nanoseconds by which time voltage-controlled amplifier 15 will have settled down and video switch 11 will be operative to pass the inset video out to the electronic display circuitry.

When the inset video signal is terminated, edge detector 17 will generate an additional strobe. The delay of delay line 18 is chosen to be significantly less than the fall-off of the inset video signal, therefore, video switch 11 will be operative to terminate the output of the inset video and re-initiate the presentation of the display video signal without disturbing the presentation seen by the viewer.

Because of delay line 18, one or two picture elements in the final display will be lost from the inset video. This delay in insetting will be unnoticed by the viewer of the display.

Because the delta output of arithmetic unit 13 will be affected by any noise in the display and inset video signals, it is advantageous to have arithmetic unit 13 provide a difference output which is the average of several readings. For example, the delta signal might be established as the average of five readings. The gain of voltage-controlled amplifier 15 would then be set according to that average difference signal. In this way the spurious effects of noise on either video line will be minimized.

Figure 2:
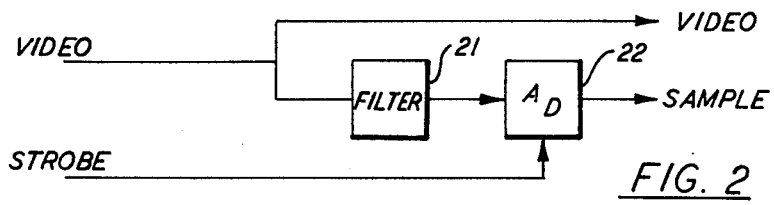
FIG. 2 indicates a method for sampling video signals using more economical, relatively narrow band converters.

The converters employed in the circuitry of FIG. 1, because they operate directly on the video signal, must be high speed devices so that they may have a frequency bandpass wide enough to pass the video without distortion. FIG. 2 suggests a less expensive alternate to the high speed converters.

In FIG. 2, a lower speed, narrower bandwidth A/D converter 22 is suggested for use with the invention when preceded by filter 21. Filter 21 will act somewhat as an averaging device and pass only those signals which converter 22 may pass without distortion.

Although A/D converter 22 is referred to as a lower speed device, the descriptor is relative. The speed of such lower bandwidth devices is still such that all logic control and gain adjustments may occur during the time required for one horizontal re-trace of the display being presented to the viewer. This being the case, the video levels could be adjusted on a line by line basis.

Figure 3:
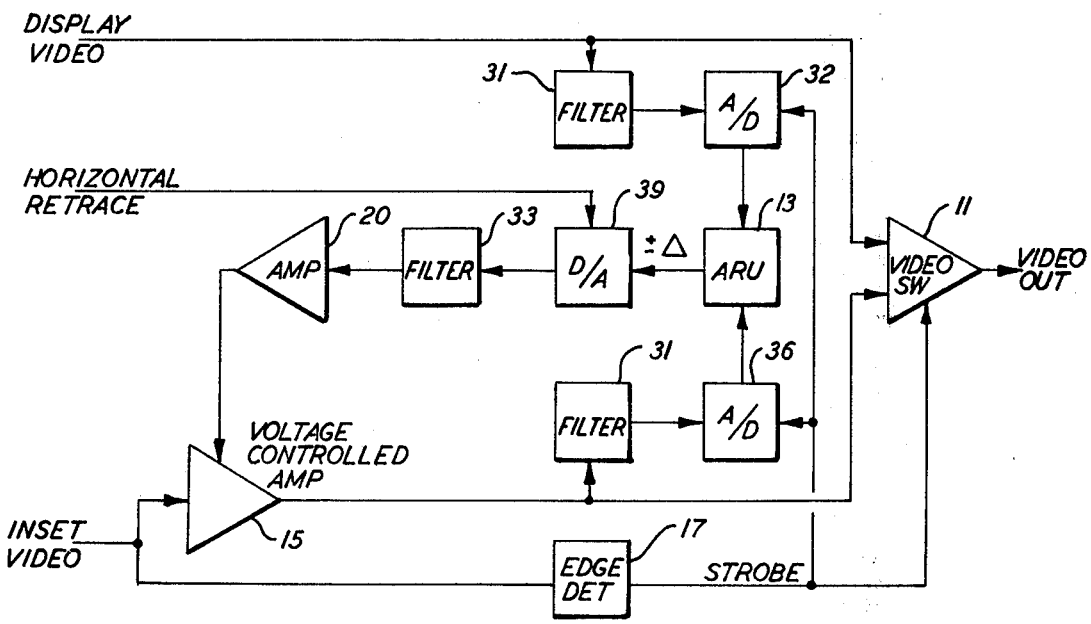
FIG. 3 is an embodiment of the invention using lower cost, relatively narrow bandwidth devices.

FIG. 3 is the less expensive, lower speed, narrower bandwidth counterpart of the circuitry depicted in FIG. 1. A/D converters 32 and 36 are substituted for converters 12 and 16, respectively, of FIG. 1. Converters 32 and 36 are preceded by filters 31 to limit the bandwidth of the video being input to the converters. D/A converter 39 is substituted for D/A converter 19 of FIG. 1. In addition, D/A converter 39 now passes the analog difference signal only upon application of the horizontal re-trace signal. Thus, the first line of the inset video to be displayed will not be gain balanced but each subsequent line thereafter will.

The addition of filter 33 at the output of D/A converter 39 in FIG. 3 may be noted. This filter will eliminate spurious noise from the output of D/A converter 39, which noise could have caused streaking in the final display.

Because the circuitry of FIG. 3 allows for the adjustment of gain during the horizontal re-trace period, on a line by line basis, it is suggested that the sample-and-hold circuitry normally found in such converters be set to allow the determination of an average reading over some portion of each video line. It is worthy also to consider the use of filter 33 to achieve averaging over a number of lines. For example, if the display had a 25 KHz line rate, and filter 33 were selected to have a 5 KHz bandpass, the smooth (i.e., averaged) video content of five scan lines would be presented to amplifier 20 to establish the control voltage for amplifier 15. Again, as before, such averaging techniques will reduce the effects of spurious noise.

Method and apparatus have been described for precisely balancing the gain of two video sources so that video from one source may be inserted, unnoticeably, into a display derived from the signals generated by the other of the two video sources. The teachings herein disclosed are particularly applicable in simulator training devices using camera-model systems in which two model boards are used, each with its own optical probe, said boards being constructed such that one model is a large scale, highly detailed segment of that scene depicted on the other of the two model boards.

A preferred embodiment of the invention has been described. It should be obvious to those skilled in the art that various changes and modifications may be made therein without departing from the invention. It is, therefore, intended to cover herein all such changes and modifications as fall within the true spirit and scope of the invention.

What I claim is:

1. Apparatus to precisely balance signals derived from two video sources comprising:

means to determine the difference in the amplitude of the signals derived from said video sources; and
means to convert said difference into a control signal used to control the gain of the signal derived from at least one of said video sources.

2. The invention of claim 1 in which the means to determine the difference in amplitude of said signals comprises:
an arithmetic unit having said difference as its output; and two A/D converters to each of which is inputted a part of a different one of said signals and whose outputs are fed to the inputs of said arithmetic unit.

3. The invention of claim 2 in which the means to convert said difference into a control signal comprises:
a D/A converter to accept the difference output of said arithmetic unit; and
a scaling amplifier to accept the analog output of said D/A and output is at the proper level for use as a control signal.

4. Apparatus to precisely balance two video signals such that a video display derived from the second of said two signals may be inset within a display derived from the first of said signals without noticeable change in the brightness levels of either display comprising:
means to generate a strobe as the inset-video signal (said second signal) is initiated and again as said inset-video signal is terminated;
means to sample both the inset-video signal and the display-video signal (said first signal) at a time determined by the occurrence of said strobe;
means to accept said samples and to derive therefrom a control voltage in accord with the difference in signal levels of said samples;
means to control the gain of one of said video signals upon application of said control voltage so as to minimize the difference in said signal levels; and
means to output one of said video signals in lieu of the other of said video signal at a time determined by the occurrence of said strobe and the time required to minimize said difference in said signal levels.

5. The invention of claim 4 in which said means to generate a strobe is an edge detector operative to output a strobe when it detects the turn-on edge of the inset-video signal train and again when it detects the turn-off edge of said signal train.

6. The invention of claim 4 in which said means to sample said inset-video and said display-video signals are A/D converters, each converter having a different one of said signals as an input, each converter outputting its contents upon application of said strobe.

7. The invention of claim 6 in which said means to accept said samples and to derive therefrom a control voltage in accord with the difference of said samples comprises:
an arithmetic unit having as its input the strobed output of said A/D converters; and
a D/A converter having as its input the differenced-output of said arithmetic unit and as its output an analog control voltage.

8. The invention of claim 7 in which said means to control the gain of one of said signals comprises:
a scaling amplifier having as its input the analog control voltage output of said D/A converter; and
a voltage-controlled amplifier in the transmission path of said signal having as its control input the output of said scaling amplifier.

9. The invention of claim 4 in which said means to control the gain of one of said video signals is a voltage-controlled amplifier in the transmission path of said signal operative upon application of said control voltage so as to minimize the difference between said inset and said display video signals.

10. The invention of claim 4 in which said means to output one of said video signals in lieu of the other of said video signals comprises:
a video switch having one of each of said video signals fed to a different input terminal of said switch and giving its output to the video display circuitry of said video display; and
a delay line having its output connected to the control terminal of said video switch and receiving as its input said strobe, said delay being chosen such that said strobe will not cause the output of said switch to change from one output signal to the other input signal until adequate time has passed to permit minimization of said difference in said signal levels.

11. A method to precisely balance signals derived from two video sources comprising the steps of:
determining the difference in the amplitude of the signals derived from said video sources; and
converting said difference into a control signal used to control the gain of the signal derived from at least one of said video sources.

12. The method of claim 11 in which the determination of the difference in the amplitude of said signals comprises the further steps of passing each of said signals through an A/D converter associated therewith and feeding the output of each of said A/D converters to an arithmetic unit having said difference as its output.

13. The method of claim 12 in which the step of converting said difference into a control signal comprises the further step of converting said difference to an analog signal by passing it through a D/A converter and then passing this analog difference signal through a scaling amplifier and outputting it at the proper level for use as a control signal.

14. A method to precisely balance two video signals such that a video display derived from the second of said two signals may be inset within a display derived from the first of said signals without noticeable change in the brightness levels of either display comprising:
generating a strobe as the inset-video signal (said second signal) is initiated and again as said inset-video signal is terminated;
sampling both the inset-video signal and the display-video signal (said first signal) at a time determined by the occurrence of said strobe;
accepting said samples and deriving therefrom a control voltage in accord with the difference in signal levels of said samples;
controlling the gain of one of said video signals upon application of said control voltage so as to minimize the difference in said signal levels; and
outputting one of said video signals in lieu of the other of said video signals at a time determined by the occurrence of said strobe and the time required to minimize said difference in said signal levels.

15. The method of claim 14 in which the step of generating said strobe comprises the further step of passing said inset-video through an edge detector which is operative to output a strobe when it detects the turn-on edge of the inset-video signal train and to again output a strobe when it detects the turn-off edge of said signal train.

16. The method of claim 14 in which the step of sampling said inset-video and said display-video signals comprises the further step of passing each of said signals through associated A/D converters, each converter having a different one of said signals as an input, and outputting the contents of each of said A/D converters upon application to it of said strobe.

17. The method of claim 16 in which the steps of accepting said samples and deriving therefrom a control voltage in accord with the difference of said samples comprises the further steps of strobing the output of said A/D converters and passing said output to an arithmetic unit; and generating an analog control voltage by passing the differenced-output of said arithmetic unit through a D/A converter.

18. The method of claim 17 in which the step of controlling the gain of one of said signals comprises the further step of passing said analog control voltage signal derived from said D/A converter through a scaling amplifier and using the output of said scaling amplifier as a control signal to be applied to a voltage-controlled amplifier through which said signal is passed.

19. The method of claim 14 in which the step of controlling the gain of one of said video signals comprises the further step of passing said video signal through a voltage-controlled amplifier and applying said control voltage to said voltage-controlled amplifier so as to control its gain thereby to minimize the difference between said inset and said display video signals.

20. The method of claim 14 in which the step of outputting one of said video signals in lieu of the other of said video signals comprises the further step of passing each of said video signals through a video switch capable of switching its output between either of said input signals and controlling the operation of said video switch by the delayed application of said strobe, further, delaying said strobe so as not to cause the output of said switch to change from one input signal to the other until adequate time has passed to permit minimization of said difference in said signal levels.

* * * * *